United States Patent
Stephenson et al.

(10) Patent No.: US 7,564,795 B2
(45) Date of Patent: Jul. 21, 2009

(54) OBTAINING PER-PORT LOCATION INFORMATION FOR WIRED LAN SWITCHES

(75) Inventors: David S. Stephenson, San Jose, CA (US); Allan Thomson, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 202 days.

(21) Appl. No.: 11/537,805

(22) Filed: Oct. 2, 2006

(65) Prior Publication Data

US 2008/0080415 A1 Apr. 3, 2008

(51) Int. Cl.
- G01R 31/08 (2006.01)
- H04B 7/00 (2006.01)
- H04L 12/28 (2006.01)
- H04W 24/00 (2009.01)
- H04B 17/00 (2006.01)

(52) U.S. Cl. ............... 370/245; 370/242; 370/244; 370/248; 370/250; 370/241; 370/351; 370/310; 455/423; 455/67.11; 455/456.1

(58) Field of Classification Search ......... 370/310, 370/242, 244, 245, 248, 250, 351; 455/456.1, 455/423, 67.11
See application file for complete search history.

(56) References Cited

U.S. PATENT DOCUMENTS

| | | | | |
|---|---|---|---|---|
| 5,539,803 A | * | 7/1996 | Bhat et al. | 379/21 |
| 6,425,132 B1 | * | 7/2002 | Chappell | 725/107 |
| 6,801,778 B2 | * | 10/2004 | Koorapaty et al. | 455/456.1 |
| 7,013,138 B2 | * | 3/2006 | Mahany | 370/338 |
| 7,085,697 B1 | * | 8/2006 | Rappaport et al. | 703/13 |
| 7,154,436 B1 | * | 12/2006 | Chadha | 342/357.1 |
| 7,320,070 B2 | * | 1/2008 | Baum | 713/153 |
| 2002/0098870 A1 | * | 7/2002 | Kashiwagi et al. | 455/561 |
| 2003/0036391 A1 | * | 2/2003 | Jordan | 455/456 |
| 2004/0125401 A1 | * | 7/2004 | Earl et al. | 358/1.15 |
| 2004/0147232 A1 | * | 7/2004 | Zodnik | 455/90.1 |
| 2004/0196810 A1 | * | 10/2004 | Kil et al. | 370/331 |
| 2005/0004746 A1 | * | 1/2005 | Morita et al. | 701/200 |
| 2005/0136972 A1 | * | 6/2005 | Smith et al. | 455/554.1 |
| 2005/0174236 A1 | * | 8/2005 | Brookner | 340/239.26 |
| 2005/0245127 A1 | * | 11/2005 | Nordin et al. | 439/540.1 |
| 2006/0014546 A1 | * | 1/2006 | Bodin et al. | 455/456.1 |
| 2007/0197262 A1 | * | 8/2007 | Smith et al. | 455/562.1 |
| 2007/0263818 A1 | * | 11/2007 | Sumioka et al. | 379/201.01 |

OTHER PUBLICATIONS

International Search Report for Application No. PCT/US07/80033 dated Aug. 19, 2008.
Written Opinion of the International Searching Authority for Application No. PCT/US07/80033.

* cited by examiner

Primary Examiner—Rafael Pérez-Gutiérrez
Assistant Examiner—Allahyar Kasraian
(74) Attorney, Agent, or Firm—Tucker Ellis & West LLP (57) ABSTRACT

In one embodiment, a device with a wireless transceiver and a network interface, such as a wireless location determination device or a laptop with wireless capability and an Ethernet port, is coupled to a network switch port via the network interface. A request for location data is sent via the wireless transceiver, and location data is provided to the wireless transceiver, enabling the location of the Ethernet outlet to which the switch port is connected to be determined.

13 Claims, 4 Drawing Sheets

OBTAINING PER-PORT LOCATION INFORMATION FOR WIRED LAN SWITCHES

BACKGROUND

Location services are valuable to devices plugged into LAN Switches via cables (e.g. Cat 5). In a carpeted enterprise environment, some location services need accuracy down to the cubicle level. This essentially means that the location of the Ethernet outlet wired to a LAN Switch port in each cubicle needs to be determined. However, determining location for the Ethernet outlet of wired ports can be a time consuming task for system administrators due, in part, to the shear number of wired ports in a building or campus environment. An additional complication is that LAN Switches are typically installed in wiring closets and are wired to cubicle Ethernet outlets via a patch panel. The patch panel allows for easy re-configuration of the floor's wiring plan. In order for the system administrator to configure the LAN Switch (or other LAN Infrastructure device), the wiring plan and patch panel must be initially verified and then audited on a regular basis to ensure each LAN Switch port is mapped to the intended cubicle. Once this process has taken place, the LAN Switch can provide location information to a client device plugged into the Ethernet outlet in the cubicle via a variety of mechanisms/protocols.

OVERVIEW OF EXAMPLE EMBODIMENTS

The following presents a simplified summary of the invention in order to provide a basic understanding of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In particular embodiments, there is described herein a way to automate configuration of location information into a LAN Switch that is independent of the wiring plan and which can be updated on a regular basis, and if desired automatically, without system administrator intervention.

There is disclosed herein an apparatus comprising a wireless transceiver, a network interface for coupling to a connection point of an associated network and control logic coupled to the wireless transceiver and the network interface that is operable to control the operation of the wireless transceiver and the network interface. The control logic is responsive to obtain present location data via the wireless transceiver and the control logic is configured to send the present location data via the network interface to a node disposed on the associated network.

"Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

Furthermore, there is disclosed herein a method for provisioning a wired local area network switch with per-port location information. The method comprising coupling a wireless device to a network switch port associated with a network, wirelessly receiving current location data by the wireless device coupled to the network switch port and associating the network switch port with the current location data. Since the location provided is actually the location of the wireless device, the switch port location is bound to the location of the Ethernet outlet in the place (e.g., cubicle, building lobby, etc.) where the wireless device is plugged into the LAN. Throughout this text, the term "Ethernet" shall also be construed to include IEEE 802.3 networks as well as traditional Ethernet.

There is also described herein a system for provisioning a wired local area network switch with per-port location information. The system comprising means for coupling a wireless device to a network switch port associated with a network, means for wirelessly receiving current location data by the wireless device coupled to the network switch port and means for associating the network switch port with the current location data.

Still other objects of the present invention will become readily apparent to those skilled in this art from the following description wherein there is shown and described an example embodiment of this invention, simply by way of illustration of at least one of the best modes best suited to carry out the invention. As it will be realized, the invention is capable of other different embodiments and its several details are capable of modifications without departing from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrates several embodiments of the present invention, and together with the description serve to explain the principles of the invention.

DESCRIPTION OF EXAMPLE EMBODIMENTS

This description provides examples not intended to limit the scope of the invention, as claimed. The figures generally indicate the features of the preferred embodiments, where it is understood and appreciated that like reference numerals are used to refer to like elements.

In one exemplary embodiment, a standalone device (hereinafter referred to as a location determination device) is plugged into a cubicle's Ethernet outlet. The location determination device is configured to request and receive location data. In one embodiment, the location determination device can determine by advertisements in 802.11 APs' beacons whether the network can provide sufficient accuracy (e.g., a system administrator can specify accuracy requirements). If the network contains a location server (e.g., Cisco 2700 Wireless Location Appliance available from Cisco Technology, Inc., 70 West Tasman Drive, San Jose, Calif. 95134-1706), then the device should be able to provide location accuracy down to the cubicle level. In one embodiment, after the location determination device receives data representative of its current location, it transmits the data representative of the current location to the LAN Switch servicing the aforementioned Ethernet outlet. In another embodiment, the location determination device transmits the data representative of its current location to a node disposed on the network. In still another embodiment, the location determination device obtains an identifier, such as an address, for the switch port can store the data representative of its current location associated with the identifier for the switch port which can be retrieved at a later time (e.g. uploaded to a database).

Location information can be provided to the the location determination device in any format, including but not limited to XML (rfc4119), geospatial (e.g., rfc3825), civic (e.g., http://www.ietf.org/internet-drafts/draft-ietf-geopriv-dhcp-civil-07.txt) or a proprietary format.

In one embodiment, when the location determination device requests its location, it requests cryptographically signed location information. The receiver of the location information (e.g., the LAN Switch) can determine whether the location information has been modified in transit (e.g., by a device masquerading as the location determination device or a rogue AP). Each receiver of the cryptographically signed location information (e.g. a LAN Switch) is capable of supporting location information that can be provisioned with the IP address of the CA Server (Certificate Authority Server), or multiple IP addresses if there are redundant servers in the network. Alternatively, the IP address of at least one CA Server could be provided by a DHCP option when the LAN Switch requests its IP address from a DHCP server. Each LAN Switch can thus determine the public key corresponding to the private key used by the Location Server to sign the location information. If the location information is determined to be unmodified, then the LAN Switch saves the location information corresponding to that switch port in its Management Information Base (MIB). If the LAN Switch determines that the location information has been modified, it simply discards the information. Additionally the switch can be configured to send an alert to a system administrator reporting that mal-formed location information was received, possibly indicating an insider attack on the network.

An alternative embodiment contemplates an application running on a Wi-Fi enabled laptop (that is also capable of coupling to a network switch port) performing the same functionality as the location determining device just described. Note that whenever a laptop is connected to an Ethernet outlet, updated location information can be provided to the network. This is acceptable since the Ethernet outlet is not mobile. However, a feature of the present invention is that this method automatically updates the location-to-switch-port binding whenever the wiring plant between the LAN switch and Ethernet outlets is modified (e.g., by change to patch panel configuration).

Automatically providing location information whenever a device (such as the location determination device or a laptop as described herein) connects to a switch port enables system administrators to obtain location data for Ethernet outlets that are not in cubicles being regularly used by end users (e.g., spare cubicles or VoIP phones located in a building's lobby) or other Ethernet outlets used for other purposes.

The example embodiments described herein illustrate a technique to automatically provision a LAN Switch (or any other node disposed on the network) with port-based location information without accurate wiring plant information. Moreover, the example embodiments described herein can be updated autonomously, with or without system administrator intervention. This can dramatically reduce management expenses associated with location determination.

Figure 1:
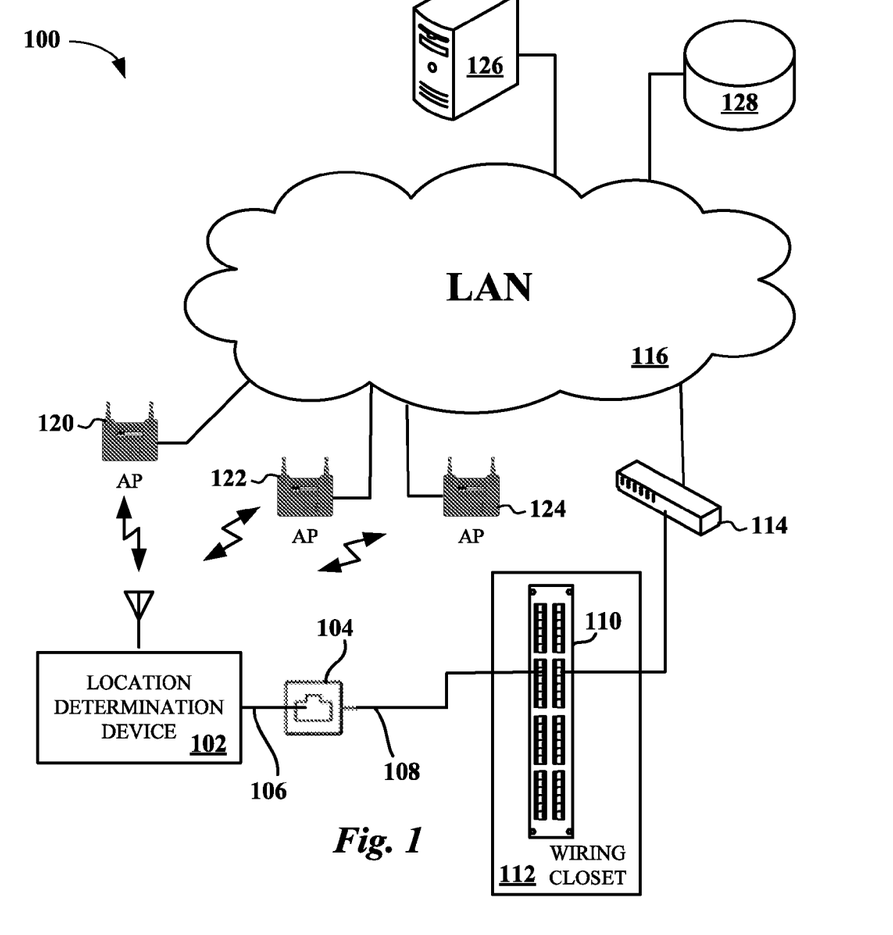
FIG. 1 is a block diagram of a system employing a location determination device for determining the location served by an Ethernet switch port.

FIG. 1 is a block diagram of a system 100 employing a location determination device 102 for determining the location served by an Ethernet outlet 104 (e.g. an Ethernet Switch port); hereinafter this will be called the location of a switch port for the sake of brevity (not to be confused with the actual location of the switch port which is physically in the wiring closet). As will be described herein, location determination device 102 comprises a communications port to communicate with Ethernet outlet 104, a wireless transceiver, and control logic for controlling the operation of the communications port and wireless transceiver and for performing the functionality described herein. Location determination device 102 is communicatively coupled to Ethernet outlet 104 via coupler 106. Coupler 106 may suitably comprise one or more of a cabled or wireless connector, such as an Ethernet Cable, RJ 45 cable, infra red (IR), optical, radio frequency (RF), etc. Ethernet outlet 104 is communicatively coupled via coupler 108 to patch panel 110 located within wiring closet 112. Patch panel 110 is coupled to switch 114 (e.g., an Ethernet switch), which is coupled to a distribution network (e.g., a local area network commonly referred to as a 'LAN') 116. Access points (APs) 120, 122, 124, location services server (LSS) 126 and database 128 (which are shown separately but database 128 can be co-located with LSS 126) are also coupled to distribution network 116. Although FIG. 1 illustrates three APs 122, 124, 126, this is merely for ease of illustration as those skilled in the art can readily appreciate that any realizable number of APs may be coupled to network 116.

In operation, while location determination device 102 is coupled to outlet 104, location determination device associates with network 116 via a wireless connection through one of APs 120, 122, 124. Location determination device 102 determines from one of APs 120, 122 and 124 the what, if any, location services are available, and if available, the resolution of the location services (e.g., can the location service determine the location within a meter, foot, or just within a building or to its associated AP).

To obtain location data, a signal is sent to one of APs 120, 122, 124 requesting location data. Location services server (LSS) 126 analyzes at least one signal from location determination device 102 received by one or more of APs 120, 122, 124. For example, LSS 126 can use received signal strength intensity (RSSI), time difference of arrival (TDOA), or any suitable technique for analyzing a signal from location determination device 102 to determine the location of location determination device 102.

In one embodiment, after determining the location of location determination device 102, LSS 126 has the AP (one of APs 120, 122, 124) associated with location determination device 102 send data representative of the determined location of location determination device 102 to location determination device 102. Location determination device 102 then sends the data representative of the determine location via coupling 106 through port 108 patch panel 110 to switch 114. Switch 114 stores the data representative of the determined location. Alternatively, or optionally, switch 114 sends the data representative of the determined location of and an identifier for Ethernet outlet 104 via network 116 to database 128 for storage by database 128.

In another embodiment, after determining the location of location determination device 102, LSS 126 has the AP (one of APs 120, 122, 124) associated with location determination device 102 send data representative of the determined location of location determination device 102 to location determination device 102. Location determination device 102 determines an identifier of port on switch 114. An identifier for port on switch 114 can be obtained via CDP (Cisco Discovery Protocol available from Cisco Systems), LLDP (Link Layer Discovery Protocol, IEEE 802.1ab) or via any suitable protocol. Location determination device 102 associates the data representative of the current location with the switch and stores it. The stored data can later be uploaded either via a wired connection or wireless connection to database 128.

In still another embodiment, location determination device 102 determines an identifier of port on switch 114 using techniques already described herein. Location determination device 102 supplies the identifier for port on switch 114 to LSS 126. After determining the current location of location determination device 102, LSS 126 stores the identifier for the port on switch 114 and the current location of location determination device 102 in database 128.

In still yet another embodiment, location determination device 102 uses a global positioning system (GPS) to determine its present location. Location determination device 102 can be configured to request and receive GPS data from a source external to network 100. After receiving the GPS data, location determination device 102 can send the GPS data via coupling 106 through port 108 patch panel 110 to switch 114. Switch 114 stores the GPS data. Alternatively, or optionally, switch 114 sends the GPS data via network 116 to database 128 for storage by database 128. In one embodiment, location determining device 102 can send GPS data along with an identifier for port on switch 114 wirelessly to one of APs 120, 122, 124, which forwards the data to one of LSS 126 and database 128 for storage. In one embodiment, location determination device 102 stores the GPS data associated with an identifier for port on switch 114, which can be uploaded to network 100 at a later time.

In the aforementioned embodiments, it is contemplated that the location data can be encrypted. Using encrypted data can ensure that the location data is authentic. For example, if location determination device is infected with malicious software, such as a virus, Trojan Horse, or other programming that may tamper with the location information, encrypting the data would be useful for detecting tampering. In a preferred embodiment, location determination device 102 does not have the encryption key. For example, if the data representative of the determined location of location determination device 102 is sent encrypted to location determination device 102, location determination device 102 forwards the data, in encrypted form to switch 114. Switch 114 can obtain the encryption key from LSS 126 (or from another authenticator or authentication server) and authenticate the data. If the data is invalid, it can be discarded. Furthermore, an alert can be issued, e.g., an entry to an error log or automatically generated message to a system administrator.

The example embodiment just described herein provides an easy technique to determine the current location of Ethernet outlets, such as outlet 104. Knowing the location of outlet 104 enables network 100 to provide location based services to devices coupled to outlet 104.

Figure 2:
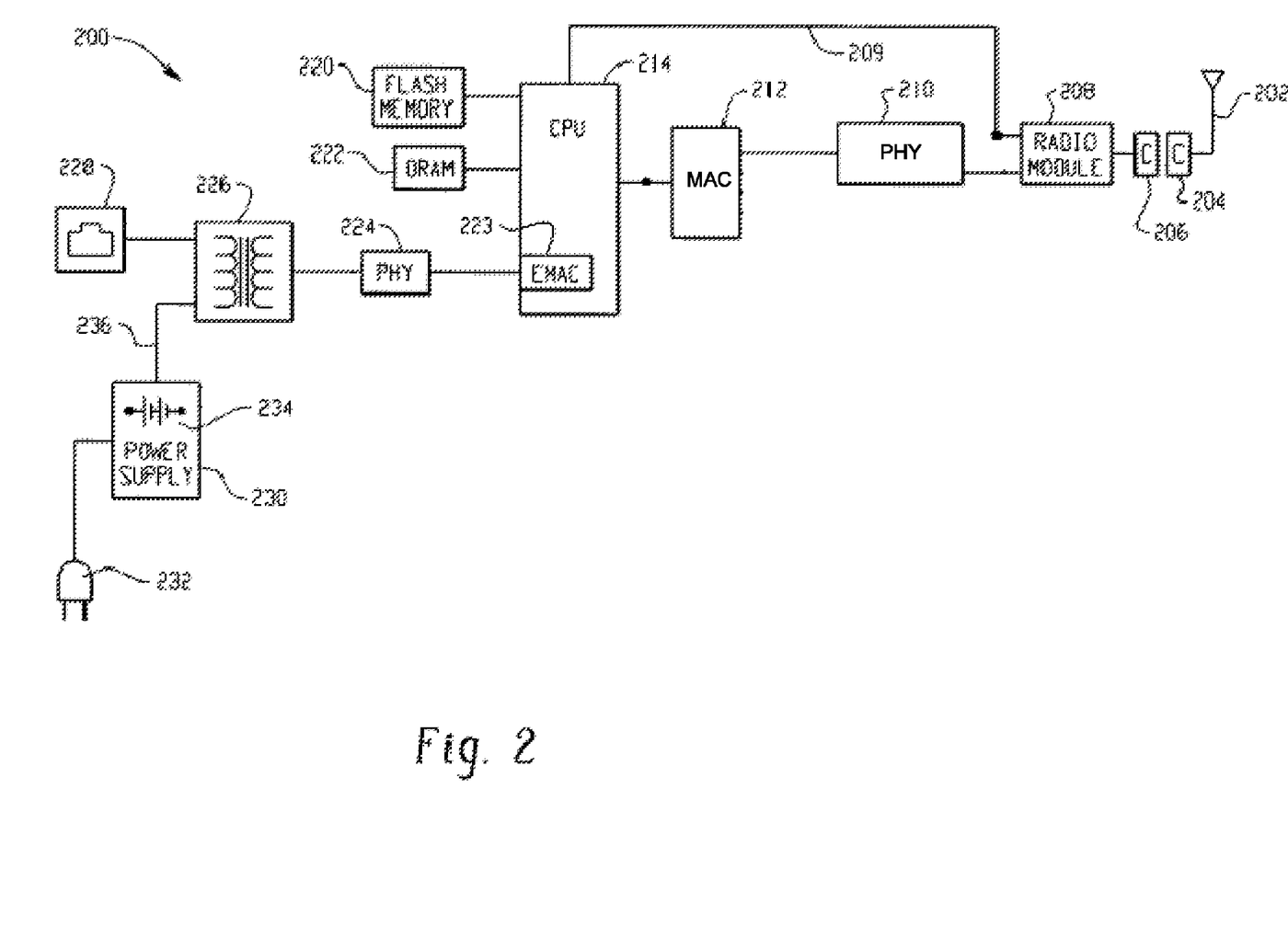
FIG. 2 is a block diagram of a location determination device.

FIG. 2 is a block diagram of a location determination device 200, suitable to perform the functionality described for location determination device 102 (FIG. 1). Wireless signals are sent and received by antenna 202 coupled to radio module 208. As illustrated in FIG. 2, antenna 202 is a connectorized antenna and is coupled to radio module 208 via connectors 204, 206. Radio module 208 monitors a predetermined frequency and receives a wireless signal, such as RF, IR, Optical, etc. Module 210 provides the physical layer processor (PHY) and module 212 provides the Media Access Control (MAC) processor.

For received signals, radio module 208 converts signals received on the predetermined frequency to a baseband signal. The baseband signal is forwarded from radio module 208 to PHY 210. A connection 209 between radio module 208 and CPU (central processing unit) 214 enables radio module 208 to alert CPU 214 when it has is received a signal. PHY 210 suitably performs signal modulation and demodulation and provides digital information to the MAC 212.

For sending signals, data from CPU 214 sends data to MAC 212 where it is framed and timed than transferred to the PHY 210. The analog signal output from PHY 210 is then forwarded to radio module 208. Radio module 208 performs any frequency conversion (e.g. baseband to RF) and transmits the signal via antenna 202.

After a received signal is processed the Radio Module 208, demodulated by PHY 210, and the received bits are framed and checked by the MAC 212, CPU 214 processes the signal accordingly. For example, CPU 214 can determine whether the signal is a valid transmission and if so the type of transmission, e.g., the type of data being sent, such as location data. CPU 214 has corresponding memories (e.g, Flash memory 220 and DRAM 222) for use by CPU 214 for temporary and semi-permanent storage, such as for storage and retrieval of memory variables and program code. When CPU completes processing the digital signal, the signal is forwarded to Ethernet Media Access Controller (EMAC) 223 for transmission on the associated network backbone (not shown, see for example network 106 in FIG. 1). EMAC 223 forwards the signal to PHY (Physical Layer controller) 224, Ethernet Magnetics 226 and Ethernet connector 228 to send the signal on the associated network.

Location determination device 200 is also capable of sending and receiving data from the associated network via connector 228, Ethernet Magnetics 226, PHY 224 and EMAC 223. CPU 214 can process the data received from the network and respond accordingly. For example, if a computing device on the associated sends a heartbeat or keep alive packet, CPU 214 responsive to receiving the packet sends a response to the device via EMAC 223, PHY 224, Ethernet Magnetics 226 and connector 228.

Location determination device 200 suitably receives power from one or more sources. For example, power supply 230 can receive power from a standard AC adapter 232, and/or power over Ethernet from Ethernet connector 228. Alternatively, or additionally, power supply 230 can have one or more batteries 234.

Figure 3:
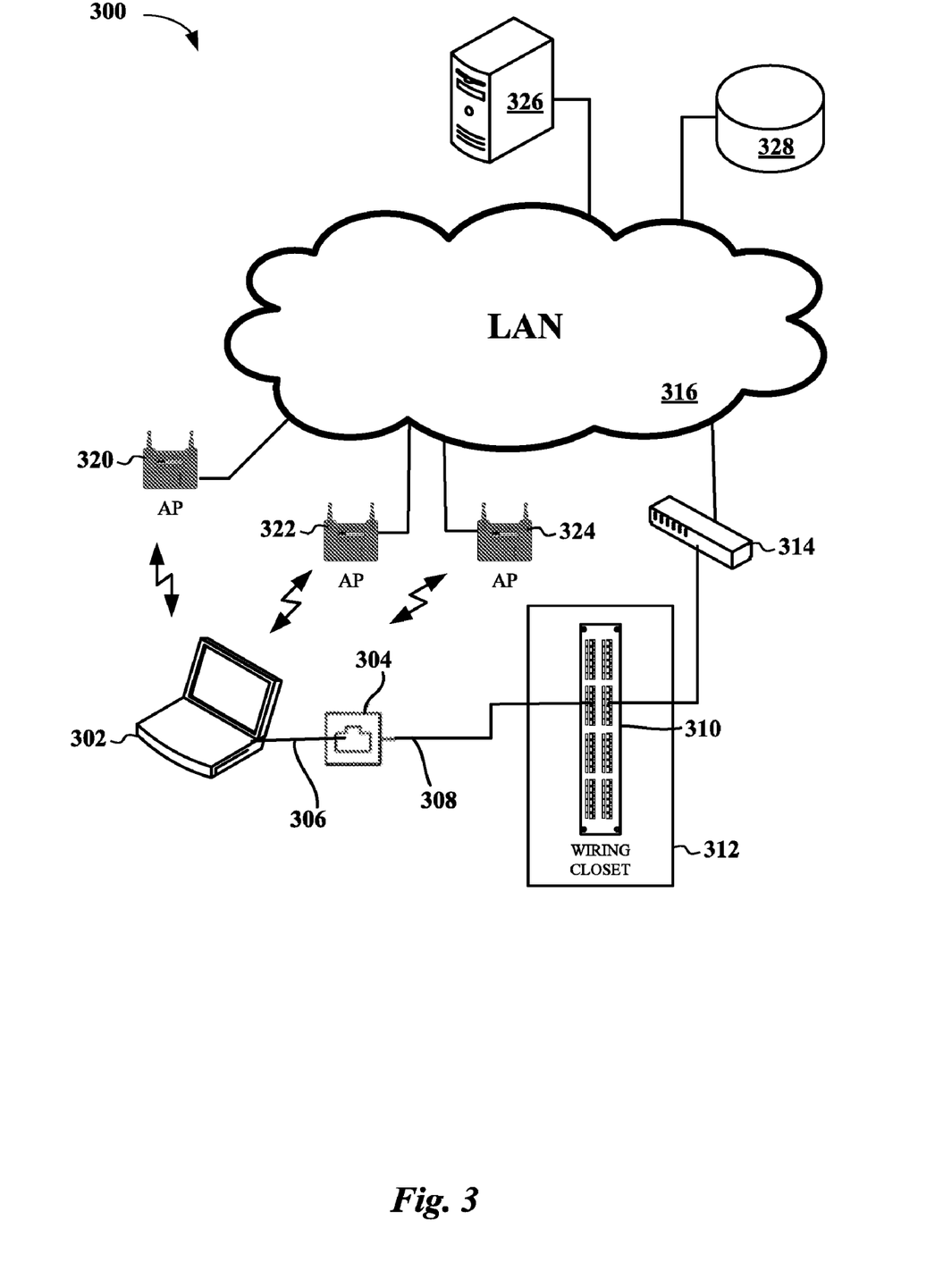
FIG. 3 is a block diagram of a system employing a laptop with wireless networking capability for determining the location served by an Ethernet switch port.

FIG. 3 is a block diagram of a system 300 employing a laptop computer 302 with wireless networking capability for determining the location of served by an Ethernet outlet 304. This embodiment leverages the capabilities of a wirelessly enabled laptop computer 302 to obtain location data allowing the laptop computer 302 to automatically update network location data.

As will be described herein, laptop computer 302 comprises a communications port to communicate with a port on switch 314, a wireless transceiver, and control logic for controlling the operation of the communications port and wireless transceiver and for performing the functionality described herein. Laptop computer 302 is communicatively coupled to Ethernet outlet 304 via coupler 306. Coupler 306 may suitably comprise one or more of a cabled or wireless connector, such as an Ethernet Cable, RJ 45 cable, infra red (IR), optical, radio frequency (RF), etc. Ethernet outlet 304 is communicatively coupled via coupler 308 to patch panel 310 located within wiring closet 312. Patch panel 310 is coupled to switch 314 (e.g., an Ethernet switch), which is coupled to a distribution network (e.g., a local area network commonly referred to as a 'LAN') 316. Access points (APs) 320, 322, 324, location services server (LSS) 326 and database 328 (which are shown separately but database 328 can be co-located with LSS 326) are also coupled to distribution network 316. Although FIG. 3 illustrates three APs 322, 324, 326, this is merely for ease of illustration as those skilled in the art can readily appreciate that any realizable number of APs may be coupled to network 316.

In operation, while laptop computer 302 is coupled to port 304, location determination device associates with network 316 via a wireless connection through one of APs 320, 322, 324. Laptop computer 302 determines from one of APs 320, 322 and 324 the what, if any, location services are available, and if available, the resolution of the location services (e.g., can the location service determine the location within a meter, foot, or just within a building or by AP).

To obtain location data, a signal is sent to one of APs 320, 322, 324 requesting location data. Location services server (LSS) 326 analyzes at least one signal from laptop computer 302 received by one or more of APs 320, 322, 324. For example, LSS 326 can use received signal strength intensity (RSSI), time difference of arrival (TDOA), or any suitable technique for analyzing a signal from laptop computer 302 to determine the location of laptop computer 302.

In one embodiment, after determining the location of laptop computer 302, LSS 326 has the AP (one of APs 320, 322, 324) associated with laptop computer 302 send data representative of the determined location of laptop computer 302 to laptop computer 302. Laptop computer 302 then sends the data representative of the determine location via coupling 306 through outlet 304 via coupling 308 to patch panel 310 to switch 314. Switch 314 stores the data representative of the determined location. Alternatively, or optionally, switch 314 sends the data representative of the determined location of and an identifier for Ethernet outlet 304 via network 316 to database 328 for storage by database 328.

In another embodiment, after determining the location of laptop computer 302, LSS 326 has the AP (one of APs 320, 322, 324) associated with laptop computer 302 send data representative of the determined location of laptop computer 302 to laptop computer 302. Laptop computer 302 determines an identifier of port 304. An identifier for port 304 can be obtained via CDP (Cisco Discovery Protocol available from Cisco Systems), LLDP (Link Layer Discovery Protocol) or via any suitable protocol. Laptop computer 302 associates the data representative of the current location with the switch and stores it. The stored data can later be uploaded either via a wired connection or wireless connection to database 328.

In still another embodiment, laptop computer 302 determines an identifier of port 304 using techniques already described herein. Laptop computer 302 supplies the identifier for port 304 to LSS 326. After determining the current location of laptop computer 302, LSS 326 stores the identifier for port 304 and the current location of laptop computer 302 in database 328.

In still yet another embodiment, laptop computer 302 uses a global positioning system (GPS) to determine its present location. Laptop computer 302 can be configured to request and receive GPS data from a source external to network 100. After receiving the GPS data, laptop computer 302 can send the GPS data via coupling 306 through port 308 patch panel 310 to switch 314. Switch 314 stores the GPS data. Alternatively, or optionally, switch 314 sends the GPS data via network 316 to database 328 for storage by database 328. In one embodiment, location determining device 102 can send GPS data along with an identifier for port on switch 314 wirelessly to one of APs 320, 322, 324, which forwards the data to one of LSS 326 and database 328 for storage. In one embodiment, laptop computer 302 stores the GPS data associated with an identifier for port on switch 314, which can be uploaded to network 100 at a later time.

In the aforementioned embodiments, it is contemplated that the location data can be encrypted. Using encrypted data can ensure that the location data is authentic. For example, if location determination device is infected with malicious software, such as a virus, Trojan Horse, or other programming that may tamper with the location information, encrypting the data would be useful for detecting tampering. In a preferred embodiment, laptop computer 302 does not have the encryption key. For example, if the data representative of the determined location of laptop computer 302 is sent encrypted to laptop computer 302, laptop computer 302 forwards the data, in encrypted form to switch 314. Switch 314 can obtain the encryption key from LSS 326 (or from another authenticator or authentication server) and authenticate the data. If the data is invalid, it can be discarded. Furthermore, an alert can be issued, e.g., an entry to an error log or automatically generated message to a system administrator.

The example embodiments described herein provide an easy technique to determine the current location of Ethernet outlets, such as outlet 304. Knowing the location of outlet 304 enables network 100 to provide location based services to devices, such as laptop 302, coupled to outlet 304.

Figure 4:
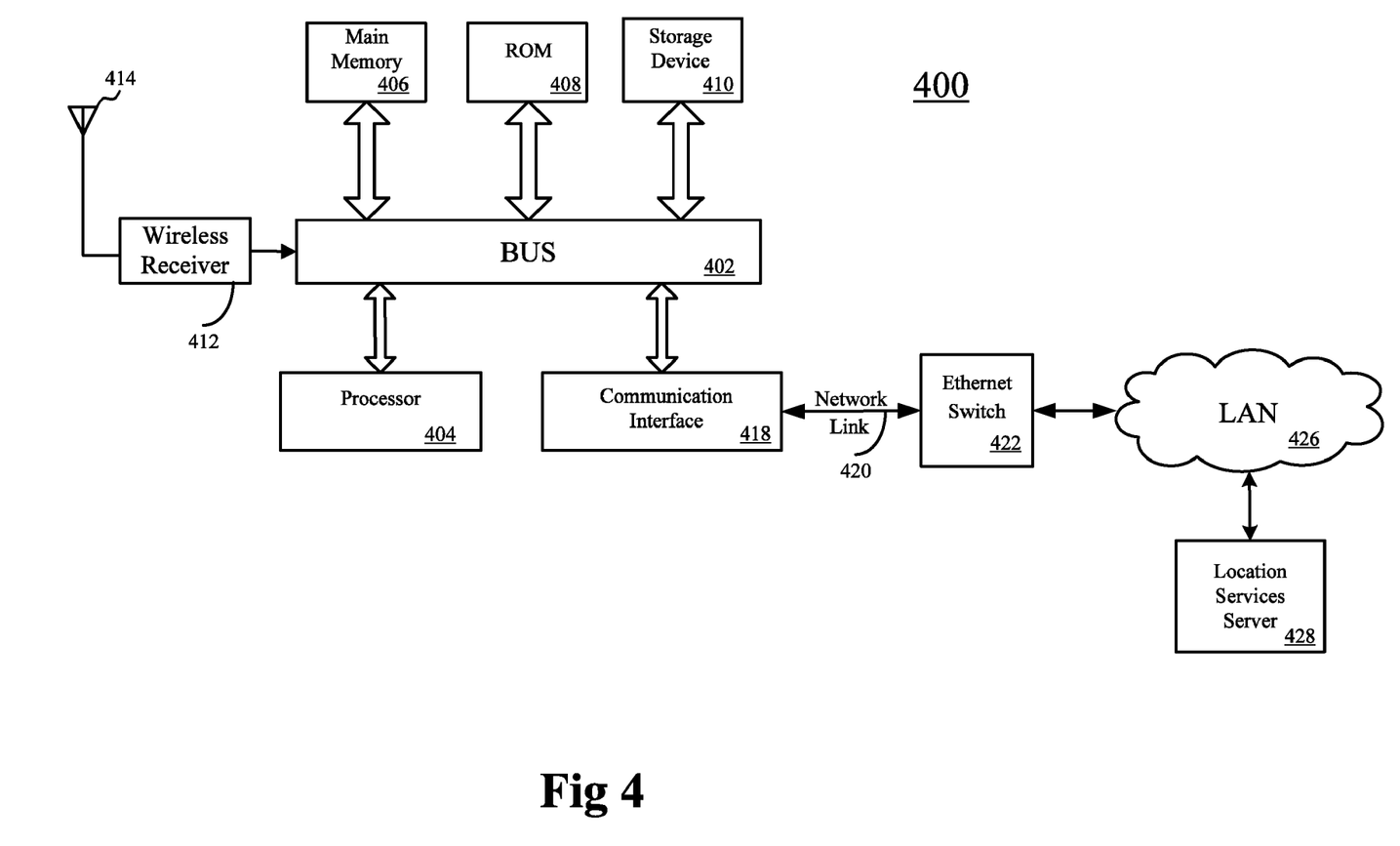
FIG. 4 is a block diagram of a computer system for implementing per-port location information for wired LAN switches.

FIG. 4 is a block diagram of a computer system 400 for implementing an embodiment of the present invention. Computer system 400 can be employed by laptop 302 (FIG. 3) and/or location detection device 102 for performing the functionality described herein.

Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

The invention is related to the use of computer system 400 for obtaining location information for wired LAN switches. According to one embodiment of the invention, obtaining location information for wired LAN switches is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to non-volatile media, volatile media, and transmission media. Non-volatile media include for example optical or magnetic disks, such as storage device 410. Volatile media include dynamic memory such as main memory 406. Transmission media include coaxial cables, copper wire and fiber optics, including the wires that comprise bus 402. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Computer system 400 also includes a communication interface 418 coupled to bus 402. Communication interface 418 provides a two-way data communication coupling to a local area network (LAN) 426 that is connected to Ethernet Switch 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Computer system 400 is coupled to wireless receiver 412. Wireless receiver 412 receives wireless signals via antenna 414. Wireless signals may be in the form of RF, IR, optical or any other type of wireless signal. Wireless receiver performs all frequency conversion, A/D conversion, modulation/demodulation (PHY functions), MAC function and forwards a signal to bus 402 for processing by processor 404. In operation, signals are sent from wireless receiver 412 to request location based data, for example as determined by a location services server 428, which may be disposed on network 428 for providing location services as described herein. The location based data is received wirelessly via antenna 414 and wireless receiver 412. Wireless receiver 412 forwards a signal with location based data to processor 404 for processing via bus 402.

Figure 5:
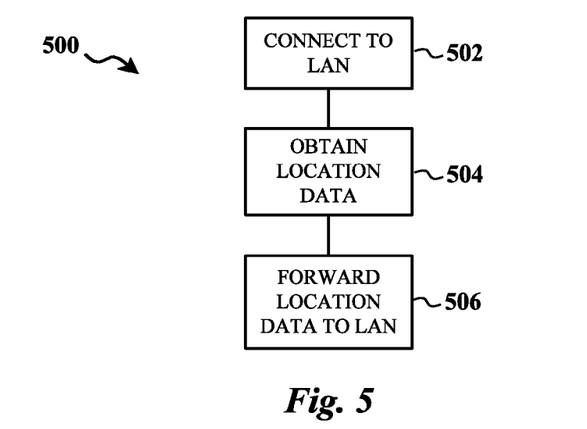
FIG. 5 is a methodology for determining location information of an Ethernet is switch port.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with particular embodiments of the present invention. Embodiments of the present invention are suitably adapted to implement the methodology in hardware, software, or a combination thereof.

FIG. 5 is a methodology 500 for determining location information of a switch port, such as an Ethernet switch port. By having current up to date information on the location of switch ports coupled to a network, location based services can be provided.

At 502, a wireless device is coupled to a switch port associated with a local area network (LAN). The device can be an apparatus specifically designed for obtaining location based data, or can be a wireless device with computing capabilities, such as a laptop computer. The connection to the switch port may be wired and/or wireless, such as via an Ethernet cable, RF, IR, optical, etc. While connecting to the LAN, the device can determine the location capabilities of the LAN or at the current connection point to the LAN. For example, the device may determine the accuracy of location information (e.g., the spatial accuracy, is the data available by building AP, or within a foot, inch, etc.).

At 504, the device obtains location data. In an example embodiment, the device sends a wireless signal to request location data. In an exemplary embodiment, the request can be made automatically upon detecting a new connection to the LAN. The wireless signal is received by one or more devices on the network, which determine the current location of the device. Data representative of the determined location is then wirelessly sent to the device. The data can be encrypted to ensure its authenticity.

If the data is being stored on the device for future uploading, an identifier for the switch port can be obtained (described herein supra). This enables the data representative of the determined location to be associated with the switch port.

At 506, the location data is forwarded to the LAN. In one embodiment, the location data is sent through the switch port to the switch. Because the switch knows which port the location data was received on, the location data can be associated with the appropriate port. The location data can then be stored by the switch. Optionally, or alternatively, the data can be forwarded to another node (e.g. a location services server or a database) on the network for processing and storage. If the data is encrypted, the network switch, or any other node on the network receiving the location data can retrieve the appropriate encryption key to decrypt, and authenticate the data.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. An apparatus comprising:
a wireless transceiver;
a network interface configured for coupling to a wired connection point of an associated network; and
a control logic coupled to the wireless transceiver and the network interface and operable to control the operation of the wireless transceiver and the network interface;
wherein the control logic is configured to obtain a first data related to present location of the wired connection point via the wireless transceiver;
wherein the control logic further configured to encrypt the first data;
wherein the control logic is configured to acquire a second data to identify the wired connection point via the network interface;

wherein the control logic is configured to associate the first data and the second data;

wherein the control logic is configured to send the associated first and second data via the network interface to a node disposed on the associated network; and wherein the node is one of a group consisting of a location services server and a local area network (LAN) switch to automatically update and record the location of the wired connection point.

2. The apparatus according to claim 1, further comprising a memory coupled to the control logic;

wherein the first data is stored in the memory with the second data.

3. The apparatus according to claim 1, wherein the control logic is configured to determine from wireless signals received by the wireless transceiver whether the wireless transceiver can receive present location data within a predetermined accuracy.

4. The apparatus according to claim 1, wherein the control logic is operative to request location data via the wireless transceiver.

5. The apparatus according to claim 1, wherein the control logic is responsive to detecting the network interface being coupled to the wired connection point of the associated network to request location data via the wireless transceiver.

6. The apparatus according to claim 1, wherein the wired connection point is one of the group consisting of an Ethernet port and an Institute of Electrical and Electronic Engineers (IEEE) 802.3 compatible port.

7. A method comprising:

coupling a wireless device to a network wired switch port associated with a network;

wirelessly receiving a first data representative of a current location of the wired switch port by the wireless device coupled to the wired switch port;

encrypting the received first data;

acquiring a second data to identify the wired switch port;

associating the first data with the second data; and sending the associated first data and second data to a node disposed on the network;

wherein the node is one of a group consisting of a location services server and a local area network (LAN) switch to automatically update and record the location of the wired switch port.

8. A method according to claim 7, further comprising storing the first data.

9. A method according to claim 7, further comprising determining accuracy of the first data.

10. A method according to claim 7, further comprising wirelessly requesting current location data responsive to coupling with the wired switch port.

11. A system comprising:

means for coupling a wireless device to a wired network switch port associated with a network;

means for wirelessly receiving a first data related to a current location of the wired network switch port via the wireless device coupled to the network switch port;

means for encrypting the first data;

means for acquiring a second data to identify the network switch port coupled to the means for coupling;

means for associating the first data and second data;

means for transmitting the associated first and second data to a node on the network;

wherein the node is one of a group consisting of a location services server and a local area network (LAN) switch to automatically update and record the location of the wired switch port.

12. A system according to claim 11, further comprising means for storing the first data.

13. A system according to claim 11, further comprising means for wirelessly requesting current location data responsive to the means for coupling connecting to the wired switch port.

* * * * *